United States Patent
Martinez Franco et al.

(10) Patent No.: US 10,865,116 B2
(45) Date of Patent: Dec. 15, 2020

(54) PROCESS FOR THE SYNTHESIS OF IZM-2 ZEOLITE IN THE PRESENCE OF A TEMPLATE, 1,6-BIS(METHYLPIPERIDINIUM)HEXANE DIHYDROXIDE

(71) Applicant: IFP Energies Nouvelles, Rueil-Malmaison (FR)

(72) Inventors: Raquel Martinez Franco, Saint Symphorien d'Ozon (FR); Nicolas Bats, Saint Symphorien d'Ozon (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 15/933,848

(22) Filed: Mar. 23, 2018

(65) Prior Publication Data

US 2018/0273391 A1    Sep. 27, 2018

(30) Foreign Application Priority Data

Mar. 24, 2017 (FR) ...................... 17 52472

(51) Int. Cl.
| | | |
|---|---|---|
| *C01B 39/04* | (2006.01) | |
| *B01J 29/70* | (2006.01) | |
| *C01B 39/48* | (2006.01) | |
| *C01B 7/19* | (2006.01) | |
| *C01D 1/02* | (2006.01) | |
| *C01F 11/02* | (2006.01) | |

(52) U.S. Cl.
CPC ............. *C01B 39/04* (2013.01); *B01J 29/70* (2013.01); *C01B 39/48* (2013.01); *C01B 7/19* (2013.01); *C01D 1/02* (2013.01); *C01F 11/02* (2013.01); *C01P 2002/72* (2013.01)

(58) Field of Classification Search
None
See application file for complete search history.

(56) References Cited

U.S. PATENT DOCUMENTS

| | | | | |
|---|---|---|---|---|
| 5,716,593 A | * | 2/1998 | Miller .................... | B01J 29/126 423/702 |
| 8,361,435 B2 | | 1/2013 | Fecant | |
| 2010/0003178 A1 | * | 1/2010 | Tokunaga .......... | B01D 53/8628 423/239.2 |
| 2011/0009632 A1 | * | 1/2011 | Fecant .................. | C01B 37/005 546/8 |
| 2011/0192765 A1 | * | 8/2011 | Guillon .................... | B01J 29/76 208/110 |
| 2013/0156690 A1 | * | 6/2013 | Itabashi .................. | C01B 39/02 423/709 |
| 2016/0023912 A1 | * | 1/2016 | Goel .................... | C01B 39/023 423/709 |

FOREIGN PATENT DOCUMENTS

EP    2170769 B1    3/2011

OTHER PUBLICATIONS

Jon H et al: "Effects of structure-directing agents on hydrothermal conversion of FAU type zeolite" Studies in Surface Science and Catalysis vol. 174, Part A, 2008, pp. 229-232.
Shibata et al:"FAU—LEV interzeolite conversion in fluoride media":Microporous and Mesoporous Materials vol. 138, Issues 1-3, Feb. 2011, pp. 32-39.
Caullet et al.: "The fluoride route: a strategy to crystalline porous materials": Comptes Rendus Chimie vol. 8, Issues 3-4, Mar.-Apr. 2005, pp. 245-266.
Search report in French Application 838558 dated Aug. 25, 2017.

* cited by examiner

*Primary Examiner* — Sheng H Davis
(74) *Attorney, Agent, or Firm* — Millen White Zelano and Branigan, PC; Csaba Henter

(57) ABSTRACT

A novel process is described for the preparation of a microporous crystalline solid, known as IZM-2 microporous solid or IZM-2 zeolite. This novel process consists of carrying out the synthesis of IZM-2 zeolite by conversion/transformation of a zeolite with structure type FAU in a fluorinated medium under hydrothermal conditions. In particular, said novel process consists of carrying out the synthesis of an IZM-2 zeolite in a fluorinated medium starting from a zeolite with structure type FAU used as the source of silicon and aluminium and a specific organic molecule or template comprising two quaternary ammonium functions, namely 1,6-bis(methylpiperidinium)hexane dihydroxide.

16 Claims, 1 Drawing Sheet

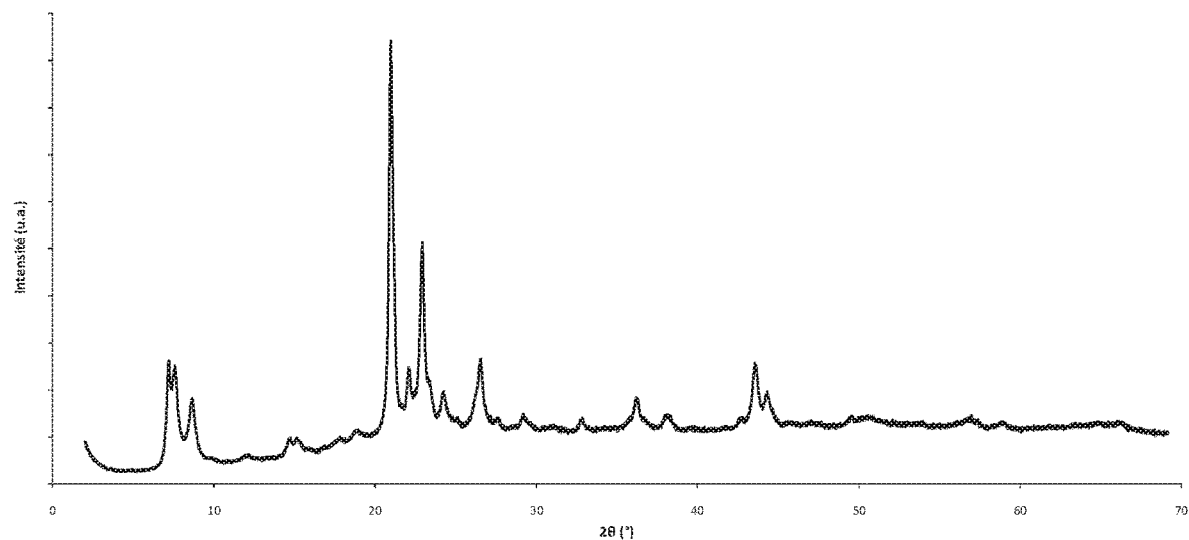

PROCESS FOR THE SYNTHESIS OF IZM-2 ZEOLITE IN THE PRESENCE OF A TEMPLATE, 1,6-BIS(METHYLPIPERIDINIUM)HEXANE DIHYDROXIDE

FIELD OF THE INVENTION

The present invention relates to a novel process for the preparation of a microporous crystalline solid, termed an IZM-2 microporous solid or IZM-2 zeolite. This novel process consists of carrying out the synthesis of the IZM-2 zeolite by conversion/transformation of a zeolite with structure type FAU under hydrothermal conditions. In particular, said novel process consists of carrying out the synthesis of an IZM-2 zeolite in a fluorinated medium, starting from a zeolite with structure type FAU used as a source of silicon and aluminium and a specific organic molecule or template comprising two quaternary ammonium functions, namely 1,6-bis(methylpiperidinium)hexane dihydroxide. Said IZM-2 microporous solid obtained using the process of the invention is advantageously of application as a catalyst, adsorbant or separating agent.

PRIOR ART

Microporous crystalline materials such as zeolites or silicoaluminophosphates are solids which are widely used in the oil industry as catalysts, catalyst supports, adsorbants or separation agents. Although many microporous crystalline structures have been discovered, the refining and petrochemicals industry is constantly seeking out novel zeolitic structures which have particular properties for applications such as purification or separation of gases, or the conversion of carbonaceous or other species.

IZM-2 zeolite is a solid with an unknown structure. Model reactions have been employed (isomerization and disproportionation of meta-xylenes and isomerization-hydrocracking of n-decane) with the aim of discerning the topology of the IZM-2 microporous material (Fecant et al. in J. Catal., 20, (2013) 20-29). The results obtained for these reactions indicate that the structure of the IZM-2 material should be considered to be constituted by two types of pore sizes (10-MR and 12-MR).

IZM-2 zeolite has been synthesised in its aluminosilicate form (Fecant et al. U.S. Pat. No. 8,361,435 B2) and in its purely silicic form (Li et al. in Microporous Mesoporous Mater., 237 (2017) 222-227), using the quaternary ammonium ion 1,6-bis(methylpiperidinium)hexane as the template, in its hydroxide and bromide form. As far as we are aware, the IZM-2 zeolite was produced using hydroxide anions as the mineralization agent.

As a general rule, zeolites are prepared by hydrothermal treatment of an aqueous gel containing an amorphous source of silica and aluminium, a mineralization agent and a template (Cundy et al. in Microporous Mesoporous Mater., 82 (2005) 1). Recently, a novel operating mode for the synthesis of zeolite has been described. This means that zeolitic structures can be produced by hydrothermal synthesis using, as the source of the reagent, at least one zeolitic structure which will be transformed into another zeolite during the synthesis process. Sano et al. in J. Jpn. Pet. Inst., 56 (2013) 183-197 proposes carrying out the synthesis of a zeolite with structure type BEA, RUT, CHA, LEV starting from a zeolite with structure type FAU using TEAOH (tetraethyl ammonium hydroxide), TMAOH (tetramethyl ammonium hydroxide), BTMAOH (benzyl trimethyl ammonium hydroxide), Choline (choline hydroxide), respectively as the organic molecule; Shi et al. in Microporous Mesoporous Mater., 200 (2014) 269-278 propose carrying out the synthesis of a zeolite with structure type MWW starting from a zeolite with structure type FAU using HMI (hexamethyleneimine) as the organic molecule; Goel et al. in Chem. Mater., 27 (2015) 2056-2066 propose carrying out the synthesis of a zeolite with structure type MFI starting from a zeolite with structure type FAU and also a zeolite with structure type BEA using TPABr (tetrapropylammonium bromide) as the organic molecule.

Regarding IZM-2, the only methods known for its preparation consist of carrying out a hydrothermal treatment of an aqueous gel containing an amorphous source of silicon and aluminium, an alkaline-earth metal ($Na_2O$) and a template agent (1,6-bis(methylpiperidinium)hexane).

The present invention concerns a novel process for the preparation of an IZM-2 zeolite by conversion/transformation of a zeolite with structure type FAU under hydrothermal conditions, in the presence of an organic nitrogen-containing compound or specific template, namely 1,6-bis(methylpiperidinium)hexane in its hydroxide form, and for the first time in the presence of at least one source of at least one fluoride anion in the synthesis of said zeolite.

In particular, the Applicant has discovered that the nitrogen-containing organic compound or template 1,6-bis(methylpiperidinium)hexane in its dihydroxide form, mixed with a zeolite with structure type FAU with a molar ratio $SiO_{2\ (FAU)}/Al_2O_{3\ (FAU)}$ of greater than or equal to 30, used as the source of silicon and of aluminium, in the presence or absence of a supplemental addition into said mixture of at least one source of at least one tetravalent element $XO_2$, and at least one source of at least one fluoride anion, leads to the production of a precursor gel for the IZM-2 zeolite with a molar ratio of the total quantity of tetravalent element/$Al_2O_3$ in the range 10 to 800, the total quantity of tetravalent element representing the sum of the $SiO_2$ content deriving from the FAU zeolite and of the $XO_2$ content deriving from the additional source of an oxide $XO_2$, in the case in which an addition of at least one additional source of an oxide $XO_2$ is carried out, then to the production of a high purity IZM-2 zeolite. Any other crystalline or amorphous phase is generally and highly preferably absent from the crystalline solid constituting the IZM-2 zeolite obtained from the preparation process.

DESCRIPTION OF THE INVENTION

Thus, the present invention concerns a process for the preparation of an IZM-2 zeolite comprising at least the following steps:

i) mixing, in an aqueous medium, at least one zeolite with structure type FAU having a molar ratio $SiO_{2\ (FAU)}/Al_2O_{3\ (FAU)}$ of greater than or equal to 30, at least one additional source of an oxide $XO_2$ in a manner such that the molar ratio $XO_2/SiO_{2\ (FAU)}$ is in the range 0 to 4, at least one nitrogen-containing organic compound R, R being 1,6-bis(methylpiperidinium)hexane dihydroxide, and at least one source of at least one fluoride anion, the mixture having the following molar composition:

| | |
|---|---|
| $(XO_2 + SiO_{2\ (FAU)})/Al_2O_{3\ (FAU)}$ | in the range 10 to 800, preferably in the range 30 to 600 |
| $H_2O/(XO_2 + SiO_{2\ (FAU)})$ | in the range 1 to 100, preferably in the range 10 to 70, |
| $R/(XO_2 + SiO_{2\ (FAU)})$ | in the range 0.01 to 0.6, preferably in the range |

-continued

| | |
|---|---|
| $BF/(XO_2 + SiO_{2\ (FAU)})$ | 0.05 to 0.45,<br>in the range 0.005 to 0.75, preferably in the range 0.01 to 0.65, | in which X is one or more tetravalent element(s) selected from the group formed by the following elements: silicon, germanium, and titanium, preferably silicon, $SiO_{2\ (FAU)}$ being the quantity of $SiO_2$ supplied by the FAU zeolite, and $Al_2O_{3\ (FAU)}$ being the quantity of $Al_2O_3$ supplied by the FAU zeolite, and in which BF is selected from fluorine salts in which B is a cation selected from the cations $NH_4^+$, $Na^+$, $K^+$ and $Li^+$, and hydrofluoric acid in aqueous solution, ii) hydrothermal treatment of said mixture obtained from step i) at a temperature in the range 120° C. to 200° C. for a period in the range 1 day to 12 days, until said IZM-2 zeolite has been formed.

Thus, one advantage of the present invention is the provision of a novel preparation process enabling an IZM-2 zeolite to be formed in a fluorinated medium, with high purity starting from a zeolite with structure type FAU, said process being carried out in the presence of a specific organic template, namely 1,6-bis(methylpiperidinium) hexane dihydroxide.

Another advantage of the present invention is the provision of a novel process for the preparation of a precursor gel of IZM-2 zeolite with a $SiO_2/Al_2O_3$ molar ratio identical to or superior to the molar ratio $SiO_{2\ (FAU)}/Al_2O_{3\ (FAU)}$ of the starting zeolite with structure type FAU. The preparation process in accordance with the invention can thus be used to adjust the $SiO_2/Al_2O_3$ ratio of the IZM-2 precursor gel obtained as a function of the additional provision or otherwise to the reaction mixture of at least one source of at least one tetravalent element $XO_2$.

DETAILED DESCRIPTION OF THE INVENTION

The present invention concerns a process for the preparation of an IZM-2 zeolite by the hydrothermal conversion/transformation of a zeolite with structure type FAU, comprising at least the following steps:

i) mixing, in an aqueous medium, at least one zeolite with structure type FAU having a molar ratio $SiO_{2\ (FAU)}/Al_2O_{3\ (FAU)}$ of greater than or equal to 30, at least one additional source of an oxide $XO_2$ in a manner such that the molar ratio $XO_2/SiO_{2\ (FAU)}$ is in the range 0 to 4, at least one nitrogen-containing organic compound R, R being 1,6-bis(methylpiperidinium)hexane dihydroxide, and at least one source of at least one fluoride anion, the mixture having the following molar composition:

| | |
|---|---|
| $(XO_2 + SiO_{2\ (FAU)})/Al_2O_{3\ (FAU)}$ | in the range 10 to 800, preferably in the range 30 to 600, |
| $H_2O/(XO_2 + SiO_{2\ (FAU)})$ | in the range 1 to 100, preferably in the range 10 to 70, |
| $R/(XO_2 + SiO_{2\ (FAU)})$ | in the range 0.01 to 0.6, preferably in the range 0.05 to 0.45, |
| $BF/(XO_2 + SiO_{2\ (FAU)})$ | in the range 0.005 to 0.75, preferably in the range 0.01 to 0.65, | in which X is one or more tetravalent element(s) selected from the group formed by the following elements: silicon, germanium, and titanium, preferably silicon, $SiO_{2\ (FAU)}$ being the quantity of $SiO_2$ supplied by the FAU zeolite, and $Al_2O_{3\ (FAU)}$ being the quantity of $Al_2O_3$ supplied by the FAU zeolite, and in which BF is selected from fluorine salts in which B is a cation selected from the cations $NH_4^+$, $Na^+$, $K^+$ and $Li^+$, and hydrofluoric acid in aqueous solution, ii) hydrothermal treatment of said mixture obtained from step i) at a temperature in the range 120° C. to 200° C. for a period in the range 1 day to 12 days, until said IZM-2 zeolite has been formed.

In accordance with the invention, a zeolite with structure type FAU having a molar ratio $SiO_{2\ (FAU)}/Al_2O_{3\ (FAU)}$ of greater than or equal to 30 preferably in the range 30 and 100 and more preferably in the range 30 and 80, is incorporated into the mixture as the source of the element silicon and aluminium in order to carry out step i). Preferably, said zeolite with structure type FAU is Y zeolite.

In accordance with the invention, the source of the element aluminium is supplied to the mixture for carrying out said step i) of the preparation process in accordance with the invention, by the zeolite with structure type FAU which is used as the source of the element silicon and aluminium.

In accordance with the invention, R is the nitrogen-containing organic compound R, with R being 1,6-bis(methylpiperidinium)hexane dihydroxide, said compound being incorporated, as the organic template, into the mixture in order to carry out step i). The anion associated with the quaternary ammonium cations present in the organic template species for the synthesis of the solid crystalline IZM-2 in accordance with the invention is the hydroxide anion.

In accordance with the invention, at least one source of at least one fluoride anion, termed BF, is added to said reaction mixture from step i), BF being selected from fluorine salts in which B is a cation selected from the cations $NH_4^+$, $Na^+$, $K^+$ and $Li^+$, and the mixture of at least two of these salts and hydrofluoric acid in aqueous solution. Preferably, the source of at least one fluoride anion is $NH_4F$ in aqueous solution.

In accordance with the invention, at least one additional source of an oxide $XO_2$, X being one or more tetravalent element(s) selected from the group formed by the following elements: silicon, germanium, titanium, and preferably silicon, is employed in the mixture of step i) in a manner such that the molar ratio $XO_2/SiO_{2\ (FAU)}$ is in the range 0 to 4, and preferably in the range 0 and 3, the $SiO_2$ content in said ratio being supplied by the FAU zeolite.

The addition or otherwise of at least one additional source of an oxide $XO_2$ thus means that the $SiO_2/Al_2O_3$ ratio of the IZM-2 precursor gel obtained from the mixing step i) can be adjusted in the case in which X=Si.

The source or sources of said tetravalent element(s) may be any compound comprising the element X and which can liberate that element in aqueous solution in a reactive form. When X is titanium, advantageously $Ti(EtO)_4$ is used as the source of titanium. In the preferred case in which X is silicon, the source of silicon may be any one of said sources routinely used for the synthesis of zeolites, for example powdered silica, silicic acid, colloidal silica, dissolved silica or tetraethoxysilane (TEOS). Powdered silicas which may be used include precipitated silicas, in particular those obtained by precipitation from a solution of alkali metal silicate, fumed silicas, for example "CAB-O-SIL", and silica gels. It is possible to use colloidal silicas with different particle sizes, for example with a mean equivalent diameter in the range 10 to 15 nm or in the range 40 to 50 nm, such as those marketed under registered trademarks such as "LUDOX". More preferably, the source of silicon is LUDOX HS-40.

In accordance with the invention, the reaction mixture obtained from step i) has the following molar composition:

| | |
|---|---|
| $(XO_2 + SiO_{2\,(FAU)})/Al_2O_{3\,(FAU)}$ | in the range 10 to 800, preferably in the range 30 to 600 and more preferably in the range 80 to 450, |
| $H_2O/(XO_2 + SiO_{2\,(FAU)})$ | in the range 1 to 100, preferably in the range 10 to 70, and more preferably in the range 15 to 55, |
| $R/(XO_2 + SiO_{2\,(FAU)})$ | in the range 0.01 to 0.6, preferably in the range 0.05 to 0.45, and more preferably in the range 0.085 to 0.4, |
| $BF/(XO_2 + SiO_{2\,(FAU)})$ | in the range 0.005 to 0.75, preferably in the range 0.01 to 0.65, and more preferably in the range 0.02 to 0.55, | in which R and BF are as defined above and in which X is one or more tetravalent element(s) selected from the group formed by the following elements: silicon, germanium, and titanium, preferably silicon, $XO_2$ being the quantity of at least one additional source of an oxide $XO_2$, $SiO_{2\,(FAU)}$ being the quantity of $SiO_2$ supplied by the FAU zeolite, and $Al_2O_{3\,(FAU)}$ being the quantity of $Al_2O_3$ supplied by the FAU zeolite.

In a preferred embodiment, the mixture of step i) may also contain at least one source of at least one alkali metal and/or alkaline-earth metal M with valency n, n being a whole number greater than or equal to 1, preferably selected from lithium, potassium, sodium, magnesium and calcium and a mixture of at least two of these metals. Preferably, the source of at least one alkali metal and/or alkaline-earth metal is sodium hydroxide.

In the preferred embodiment in which the mixture of step i) also contains at least the source of at least one alkali metal and/or alkaline-earth metal, the reaction mixture has the following molar composition:

| | |
|---|---|
| $(XO_2 + SiO_{2\,(FAU)})/Al_2O_{3\,(FAU)}$ | in the range 10 to 800, preferably in the range 80 to 400, |
| $H_2O/(XO_2 + SiO_{2\,(FAU)})$ | in the range 1 to 100, preferably in the range 10 to 70, |
| $R/(XO_2 + SiO_{2\,(FAU)})$ | in the range 0.01 to 0.6, preferably in the range 0.05 to 0.45, |
| $BF/(XO_2 + SiO_{2\,(FAU)})$ | in the range 0.005 to 0.75, preferably in the range 0.01 to 0.65, |
| $M_{2/n}O(XO_2 + SiO_{2\,(FAU)})$ | in the range 0.005 to 0.35, preferably in the range 0.01 to 0.3, | in which X, M, BF, $Al_2O_{3\,(FAU)}$, $SiO_{2\,(FAU)}$ and $XO_2$ have the definitions given above.

Step i) of the process in accordance with the invention consists of preparing an aqueous reaction mixture of the IZM-2 zeolite termed a precursor gel and comprising at least one zeolite with structure type FAU, optionally a source of an oxide $XO_2$, at least one organic nitrogen-containing compound R, R being 1,6-bis(methylpiperidinium)hexane dihydroxide, in the presence of at least one source of one or more fluoride salts and/or hydrofluoric acid in aqueous solution. The quantities of said reagents are adjusted in a manner such as to endow this gel with a composition that can allow it to crystallize into an IZM-2 zeolite.

It may be advantageous to add seeds of IZM-2 zeolite to the reaction mixture during said step i) of the process of the invention in order to reduce the time necessary for the formation of crystals of IZM-2 zeolite and/or the total crystallization period. Said seeds also promote the formation of said IZM-2 zeolite to the detriment of the impurities. Such seeds comprise crystalline solids, in particular crystals of IZM-2 zeolite. The crystalline seeds are generally added in a proportion in the range 0.01% to 10% of the mass of the source of at least one oxide of said tetravalent element(s) used in the reaction mixture.

In accordance with step ii) of the process in accordance with the invention, the gel obtained from step i) undergoes a hydrothermal treatment, preferably carried out at a temperature in the range 120° C. to 200° C. for a period in the range 1 day to 12 days, until the IZM-2 zeolite is formed. The gel is advantageously used under hydrothermal conditions under an autogenous reaction pressure, optionally by adding a gas, for example nitrogen, at a temperature which is preferably in the range 120° C. to 195° C., preferably in the range 150° C. to 195° C., until crystals of IZM-2 zeolite are formed. In accordance with the invention, the time necessary to obtain crystallization varies between 1 day and 12 days, preferably between 2 days and 11 days and more preferably between 3 days and 10 days. The reaction is generally carried out with stirring or in the absence of stirring, preferably with stirring.

At the end of the reaction, when said IZM-2 zeolite is formed as a result of carrying out said step ii) of the preparation process in accordance with the invention, the solid phase of IZM-2 zeolite which is formed is preferably filtered, washed then dried. Drying is generally carried out at a temperature in the range 20° C. to 150° C., preferably in the range 60° C. to 100° C., for a period in the range 5 to 24 hours. The dried zeolite may then advantageously be calcined. The IZM-2 zeolite, which has been calcined, is generally analysed by X ray diffraction, this technique also being used to determine the purity of said zeolite obtained by the process of the invention. Highly advantageously, the process of the invention results in the formation of an IZM-2 zeolite, in the absence of any other crystalline or amorphous phases. Said zeolite, after the drying step, is then ready for subsequent steps such as calcining and ion exchange. For these steps, any of the conventional methods known to the person skilled in the art may be employed.

The step for calcining the IZM-2 zeolite obtained in accordance with the process of the invention is preferably carried out at a temperature in the range 500° C. to 700° C. for a period in the range 5 to 20 hours. The IZM-2 zeolite obtained from the calcining step is free from any organic species, and in particular from the organic template R.

At the end of said calcining step, X ray diffraction can be used to verify that the solid obtained by the process in accordance with the invention is indeed IZM-2 zeolite. The solid obtained has an X ray diffraction spectrum including at least the peaks recorded in Table 1.

This diffraction spectrum is obtained by radiocrystallographic analysis using a diffractometer employing the conventional powder technique with the $K_{\alpha 1}$ peak of copper ($\lambda=1.5406$ Å). From the position of the diffraction peaks represented by the angle $2\theta$, the characteristic interplanar spacings $d_{hkl}$ of the sample are calculated using the Bragg relationship. The error in the measurement of $d_{hkl}$, $\Delta(d_{hkl})$, is calculated by the Bragg relationship as a function of the absolute error $\Delta(2\theta)$ in the measurement of $2\theta$. An absolute error $\Delta(2\theta)$ of $\pm 0.02°$ is customarily acceptable. The relative intensity $I_{rel}$ in each value of $d_{hkl}$ is measured from the height of the corresponding diffraction peak. The X ray diffraction diagram of the IZM-2 crystalline solid in accordance with the invention comprises at least the peaks at the values of $d_{hkl}$ given in Table 1. In the $d_{hkl}$ column, the mean values of the interplanar spacings are shown in Angstroms (Å). Each of these values must be supplemented with an error measurement $\Delta(d_{hkl})$ in the range $\pm 0.6$ Å to $\pm 0.01$ Å.

TABLE 1

Mean values of $d_{hkl}$ and relative intensities measured on an X ray diffraction spectrum of the calcined crystalline solid IZM-2

| 2 theta (°) | $d_{hkl}$ (Å) | $I_{rel}$ |
|---|---|---|
| 7.21 | 12.25 | Mw |
| 7.58 | 11.66 | Mw |
| 8.66 | 10.21 | W |
| 14.69 | 6.02 | Vw |
| 15.18 | 5.83 | Vw |
| 17.79 | 4.98 | Vw |
| 18.85 | 4.70 | Vw |
| 20.98 | 4.23 | Vs |
| 22.10 | 4.02 | Mw |
| 22.93 | 3.88 | Mw |
| 23.34 | 3.81 | W |
| 24.24 | 3.67 | Vw |
| 26.24 | 3.39 | Vw |
| 26.54 | 3.36 | W |
| 27.63 | 3.23 | Vw |
| 29.18 | 3.06 | Vw |
| 32.78 | 2.73 | Vw |
| 36.22 | 2.48 | Vw |
| 38.02 | 2.36 | Vw |
| 42.63 | 2.12 | Vw |
| 43.57 | 2.08 | W |
| 44.31 | 2.04 | Vw | in which: Vs=very strong; S=strong; M=medium; Mw=medium weak; W=weak; Vw=very weak. The relative intensity $I_{rel}$ is given with respect to a relative scale of intensity, in which a value of 100 is attributed to the most intense peak of the X ray diffraction diagram: Vw<15; 15≤W<30; 30≤Mw<50; 50≤M<65; 65≤S<85; Vs≥85.

It is also advantageous to obtain the hydrogen form of the IZM-2 zeolite obtained by the process in accordance with the invention. Said hydrogen form may be obtained by carrying out an ion exchange with an acid, in particular a strong mineral acid such as hydrochloric acid, sulphuric acid or nitric acid, or with a compound such as ammonium chloride, sulphate or nitrate. The ion exchange may be carried out by taking up said IZM-2 zeolite into suspension in one or more batches with the ion exchange solution. Said zeolite may be calcined before or after the ion exchange, or between two ion exchange steps. Preferably, the zeolite is calcined before the ion exchange, in order to eliminate any organic substance included in the pores of the zeolite, so that ion exchange is facilitated.

After ion exchange, the IZM-2 zeolite obtained by the process of the invention may be used as an acidic solid for catalysis in the fields of refining and petrochemistry. It may also be used as an adsorbant for controlling pollution or as a molecular sieve for separation.

As an example, when it is used as a catalyst, the zeolite prepared in accordance with the process of the invention is calcined, exchanged and is preferably in the hydrogen form, and may be associated with an inorganic matrix which may be inert or catalytically active, and with a metallic phase. The inorganic matrix may be present simply as a binder in order to keep the small particles of the zeolite together in the various known forms for catalysts (extrudates, pellets, beads, powders), or in fact it may be added as a diluent in order to impose the degree of conversion in a process which would otherwise occur at too fast a rate, leading to clogging of the catalyst as a result of too much coke formation. Typical inorganic matrices are in particular support materials for the catalysts, such as silica, the various forms of alumina, magnesia, zirconia, oxides of titanium, boron, titanium, zirconium, aluminium phosphates, kaolinic clays, bentonites, montmorillonites, sepiolite, attapulgite, Fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix may be a mixture of different compounds, in particular of an inert phase and an active phase.

The zeolite prepared in accordance with the process of the invention may also be associated with at least one other zeolite and act as the principal active phase or the additive.

The metallic phase is introduced onto the zeolite alone, the inorganic matrix alone or the inorganic matrix-zeolite assembly by ion exchange or impregnation with cations or oxides selected from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic classification of the elements. The metals may be introduced either all in the same manner, or using different techniques, at any point of the preparation, before or after shaping and in any order. In addition, intermediate treatments such as, for example, calcining and/or reduction, may be applied between deposits of the various metals.

The catalytic compositions comprising the IZM-2 zeolite prepared in accordance with the process of the invention are in general suitable for carrying out the principal processes for the transformation of hydrocarbons and reactions for the synthesis of organic compounds such as ethers.

Any method for shaping which is known to the person skilled in the art is suitable for the catalyst comprising the IZM-2 zeolite. As an example, it may be possible to use pelletization or extrusion, or shaping into beads. The shaping of the catalyst containing the zeolite prepared in accordance with the process of the invention and being at least in part in the acidic form is generally such that the catalyst is preferably in the form of extrudates or beads with a view to their use.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1752472, filed Mar. 24, 2017 are incorporated by reference herein.

The invention will now be illustrated in the following examples, which are not in any case limiting in nature.

Example 1: Preparation of
1,6-Bis(Methylpiperidinium) Hexane Dihydroxide
(R(OH)2 Template) Starting from
1,6-Bis(Methylpiperidinium) Hexane Dibromide 50 g of 1,6-dibromohexane (0.20 mole, 99%, Alfa Aesar) was added to a 1 L flask containing 50 g of N-methylpiperidine (0.51 mole, 99%, Alfa Aesar) and 200 mL of ethanol. The reaction medium was stirred and heated under reflux for 5 h. The mixture was then cooled to ambient temperature and filtered. The mixture was poured into 300 mL of cold diethylether, then the precipitate formed was filtered and washed with 100 mL of diethylether. The solid obtained was recrystallized from an ethanol/ether mixture. The solid obtained was dried under vacuum for 12 h. 71 g of a white solid was obtained (i.e. a yield of 80%).

The product had the expected $^1$H NMR spectrum. $^1$H NMR (D$_2$O, ppm/TMS): 1.27 (4H, m); 1.48 (4H, m); 1.61 (4H, m); 1.70 (8H, m); 2.85 (6H, s); 3.16 (12H, m).

18.9 g of Ag$_2$O (0.08 mole, 99%, Aldrich) was added to a 250 mL Teflon beaker containing 30 g of the 1,6-bis (methylpiperidinium) dibromide template (0.07 mole) prepared in accordance with Example 1 and 100 mL of deionized water. The reaction medium was stirred in the absence of light for 12 h. The mixture was then filtered. The filtrate obtained was composed of an aqueous solution of 1,6-bis (methylpiperidinium)hexane dihydroxide. This species was assayed by proton NMR using formic acid for calibration.

Example 2: Preparation of an IZM-2 Solid in Accordance with the Invention 51 mg of a zeolite with structure type FAU (CBV780, SiO$_2$/Al$_2$O$_3$=80, Zeolyst) was mixed with 1621.3 mg of an aqueous solution of 1,6-bis(methylpiperidinium)hexane dihydroxide (20.04% by weight) prepared in accordance with Example 2, and stirring of the mixture was maintained for 10 minutes. In order to promote the formation of the crystalline solid IZM-2, 5 mg of IZM-2 zeolite seeds was added to the synthesised mixture and stirring was maintained for 5 minutes. 342.6 mg of colloidal silica (Ludox HS40, 40% by weight, Aldrich) was incorporated into the synthesised mixture and stirring was maintained for 15 minutes. 575 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 SiO$_2$: 0.0033 Al$_2$O$_3$: 0.33 R(OH)$_2$: 0.5 NH$_4$F: 33.33 H$_2$O, i.e. a SiO$_2$/Al$_2$O$_3$ ratio of 300. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 3: Preparation of an IZM-2 Solid in Accordance with the Invention 51 mg of a zeolite with structure type FAU (CBV780, SiO$_2$/Al$_2$O$_3$=80, Zeolyst) was mixed with 1228.2 mg of an aqueous solution of 1,6-bis(methylpiperidinium)hexane dihydroxide (20.04% by weight) prepared in accordance with Example 2 and with 630 mg of deionized water. Stirring of the mixture obtained was maintained for 10 minutes. In order to promote the formation of the crystalline solid IZM-2, 5 mg of IZM-2 zeolite seeds was added to the synthesised mixture and stirring was maintained for 5 minutes. 342.6 mg of colloidal silica (Ludox HS40, 40% by weight, Aldrich) was incorporated into the synthesised mixture and stirring was maintained for 15 minutes. 58 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 SiO$_2$: 0.0033 Al$_2$O$_3$: 0.25 R(OH)$_2$: 0.05 NH$_4$F: 33.33 H$_2$O, i.e. a SiO$_2$/Al$_2$O$_3$ ratio of 300. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 4: Preparation of an IZM-2 Solid in Accordance with the Invention 51 mg of a zeolite with structure type FAU (CBV780, SiO$_2$/Al$_2$O$_3$=80, Zeolyst) was mixed with 412 mg of an aqueous solution of 1,6-bis(methylpiperidinium)hexane dihydroxide (20.04% by weight) prepared in accordance with Example 2 and with 513 mg of deionized water. Stirring of the mixture obtained was maintained for 10 minutes. In order to promote the formation of the crystalline solid IZM-2, 5 mg of IZM-2 zeolite seeds was added to the synthesised mixture and stirring was maintained for 5 minutes. 109 mg of colloidal silica (Ludox HS40, 40% by weight, Aldrich) was incorporated into the synthesised mixture and stirring was maintained for 15 minutes. 29 mg of an aqueous solution containing 10% by weight of ammonium fluoride (≥99.9% by weight, Aldrich) was incorporated into the synthesised mixture and stirring was maintained for the time necessary to evaporate the solvent until the desired concentration for the gel was obtained, i.e. the molar composition of the mixture was as follows: 1 SiO$_2$: 0.0066 Al$_2$O$_3$: 0.17 R(OH)$_2$: 0.05 NH$_4$F: 33.33 H$_2$O, i.e. a SiO$_2$/Al$_2$O$_3$ ratio of 150. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2. The diffraction spectrum for the calcined solid IZM-2 is given in FIG. 1.

Example 5: Preparation of an IZM-2 Solid in Accordance with the Invention 51 mg of a zeolite with structure type FAU (CBV780, SiO$_2$/Al$_2$O$_3$=80, Zeolyst) was mixed with 412 mg of an aqueous solution of 1,6-bis(methylpiperidinium)hexane dihydroxide (20.04% by weight) prepared in accordance with Example 2 and with 453 mg of deionized water. Stirring of the mixture obtained was maintained for 10 minutes. In order to promote the formation of the crystalline solid IZM-2, 5 mg of seeds of the IZM-2 zeolite was added to the synthesised mixture and stirring was maintained for 5 minutes. 109 mg of colloidal silica (Ludox HS40, 40% by weight, Aldrich) was incorporated into the synthesised mixture and stirring was maintained for 15 minutes. 96 mg of an aqueous solution containing 10% by weight of ammonium fluoride (≥99.9% by weight, Aldrich) was incorporated into the synthesised mixture and stirring was maintained for the time necessary to evaporate the solvent until the desired concentration for the gel was obtained, i.e. the molar composition of the mixture was as follows: 1 $SiO_2$: 0.0066 $Al_2O_3$: 0.17 $R(OH)_2$: 0.17 $NH_4F$: 33.33 $H_2O$, i.e. a $SiO_2/Al_2O_3$ ratio of 150. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 6: Preparation of an IZM-2 Solid in Accordance with the Invention 90 mg of a zeolite with structure type FAU (CBV780, $SiO_2/Al_2O_3$=80, Zeolyst) was mixed with 485.1 mg of an aqueous solution of 1,6-bis(methylpiperidinium)hexane dihydroxide (20.04% by weight) prepared in accordance with Example 2 and with 649 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 55 mg of colloidal silica (Ludox HS40, 40% by weight, Aldrich) was incorporated into the synthesised mixture and stirring was maintained for 15 minutes. 34 mg of an aqueous solution containing 10% by weight of ammonium fluoride (≥99.9% by weight Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.01 $Al_2O_3$: 0.17 $R(OH)_2$: 0.05 $NH_4F$: 33.33 $H_2O$, i.e. a $SiO_2/Al_2O_3$ ratio of 100. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 7: Preparation of an IZM-2 Solid in Accordance with the Invention 90 mg of a zeolite with structure type FAU (CBV780, $SiO_2/Al_2O_3$=80, Zeolyst) was mixed with 954.6 mg of an aqueous solution of 1,6-bis(methylpiperidinium)hexane dihydroxide (20.04% by weight) prepared in accordance with Example 2 and with 1 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 55 mg of colloidal silica (Ludox HS40, 40% by weight, Aldrich) was incorporated into the synthesised mixture and stirring was maintained for 15 minutes. 339 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.01 $Al_2O_3$: 0.33 $R(OH)_2$: 0.5 $NH_4F$: 33.33 $H_2O$, i.e. a $SiO_2/Al_2O_3$ ratio of 100. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 8: Preparation of an IZM-2 Solid in Accordance with the Invention 90 mg of a zeolite with structure type FAU (CBV780, $SiO_2/Al_2O_3$=80, Zeolyst) was mixed with 723.2 mg of an aqueous solution of 1,6-bis(methylpiperidinium)hexane dihydroxide (20.04% by weight) prepared in accordance with Example 2 and with 388 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 55 mg of colloidal silica (Ludox HS40, 40% by weight, Aldrich) was incorporated into the synthesised mixture and stirring was maintained for 15 minutes. 113 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.01 $Al_2O_3$: 0.25 $R(OH)_2$: 0.17 $NH_4F$: 33.33 $H_2O$, i.e. a $SiO_2/Al_2O_3$ ratio of 100. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 9: Preparation of an IZM-2 Solid in Accordance with the Invention 90 mg of a zeolite with structure type FAU (CBV780, $SiO_2/Al_2O_3$=80, Zeolyst) was mixed with 436.7 mg of an aqueous solution of 1,6-bis(methylpiperidinium)hexane dihydroxide (20.04% by weight) prepared in accordance with Example 2 and with 597 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 27.5 mg of colloidal silica (Ludox HS40, 40% by weight, Aldrich) was incorporated into the synthesised mixture and stirring was maintained for 15 minutes. 30 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.011 $Al_2O_3$: 0.17 $R(OH)_2$: 0.05 $NH_4F$: 33.33 $H_2O$, i.e. a $SiO_2/Al_2O_3$ ratio of 90. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 10: Preparation of an IZM-2 Solid in Accordance with the Invention 90 mg of a zeolite with structure type FAU (CBV780, $SiO_2/Al_2O_3$=80, Zeolyst) was mixed with 436.7 mg of an aqueous solution of 1,6-bis(methylpiperidinium)hexane dihydroxide (20.04% by weight) prepared in accordance with Example 2 and with 533 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 27.5 mg of colloidal silica (Ludox HS40, 40% by weight, Aldrich) was incorporated into the synthesised mixture and stirring was maintained for 15 minutes. 102 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.011 $Al_2O_3$: 0.17 $R(OH)_2$: 0.17 $NH_4F$: 33.33 $H_2O$, i.e. a $SiO_2/Al_2O_3$ ratio of 90. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 11: Preparation of an IZM-2 Solid in Accordance with the Invention 90 mg of a zeolite with structure type FAU (CBV780, $SiO_2/Al_2O_3$=80, Zeolyst) was mixed with 859.3 mg of an aqueous solution of 1,6-bis(methylpiperidinium)hexane dihydroxide (20.04% by weight) prepared in accordance with Example 2 and with 14 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 27.5 mg of colloidal silica (Ludox HS40, 40% by weight, Aldrich) was incorporated into the synthesised mixture and stirring was maintained for 15 minutes. 305 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.011 $Al_2O_3$: 0.33 $R(OH)_2$: 0.5 $NH_4F$: 33.33 $H_2O$, i.e. a $SiO_2/Al_2O_3$ ratio of 90. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 12: Preparation of an IZM-2 Solid in Accordance with the Invention 90 mg of a zeolite with structure type FAU (CBV780, $SiO_2/Al_2O_3$=80, Zeolyst) was mixed with 388.2 mg of an aqueous solution of 1,6-bis(methylpiperidinium)hexane dihydroxide (20.04% by weight) prepared in accordance with Example 2 and with 488 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 90 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.013 $Al_2O_3$: 0.17 $R(OH)_2$: 0.17 $NH_4F$: 33.33 $H_2O$, i.e. a $SiO_2/Al_2O_3$ ratio of 80. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 13: Preparation of an IZM-2 Solid in Accordance with the Invention 90 mg of a zeolite with structure type FAU (CBV780, $SiO_2/Al_2O_3$=80, Zeolyst) was mixed with 763.9 mg of an aqueous solution of 1,6-bis(methylpiperidinium)hexane dihydroxide (20.04% by weight) prepared in accordance with Example 2 and with 27 mg of deionized water. Stirring of the mixture obtained was maintained for 10 minutes. In order to promote the formation of the crystalline solid IZM-2, 9 mg of IZM-2 zeolite seeds was added to the synthesised mixture and stirring was maintained for 5 minutes. 271 mg of an aqueous solution containing 10% by weight of ammonium fluoride (≥99.9% by weight, Aldrich) was incorporated into the synthesised mixture, and stirring was maintained for the time necessary to evaporate the solvent until the desired concentration for the gel was obtained, i.e. the molar composition of the mixture was as follows: 1 $SiO_2$: 0.013 $Al_2O_3$: 0.33 $R(OH)_2$: 0.5 $NH_4F$: 33.33 $H_2O$, i.e. a $SiO_2/Al_2O_3$ ratio of 80. The mixture was then transferred into an autoclave following homogenization. The autoclave was closed then heated for 8 days at 170° C., with stirring. The crystalline product obtained was filtered, washed with deionized water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

Example 14: Preparation of an IZM-2 Solid in Accordance with the Invention 54 mg of a zeolite with structure type FAU (CBV780, $SiO_2/Al_2O_3$=80, Zeolyst) was mixed with 650.3 mg of an aqueous solution of 1,6-bis(methylpiperidinium)hexane dihydroxide (20.04% by weight) prepared in accordance with Example 2 and with 896 mg of deionized water. Stirring of the mixture obtained was maintained for 10 minutes. 82 mg of an aqueous solution containing 20% by weight of sodium hydroxide (98% by weight, Aldrich) was added. In order to promote the formation of the crystalline solid IZM-2, 5 mg of IZM-2 zeolite seeds was added to the synthesised mixture and stirring was maintained for 15 minutes. 362.7 mg of colloidal silica (Ludox HS40, 40% by weight, Aldrich) was incorporated into the synthesised mixture. Finally, 305 mg of an aqueous solution containing 10% by weight of ammonium fluoride (≥99.9% by weight Aldrich) was added and stirring of the mixture was maintained for the time necessary to evaporate the solvent until the desired concentration for the gel was obtained, i.e. the molar composition of the mixture was as follows: 1 $SiO_2$: 0.0033 $Al_2O_3$: 0.125 $R(OH)_2$: 0.0625 $Na_2O$: 0.25 $NH_4F$: 33.33 $H_2O$, i.e. a $SiO_2/Al_2O_3$ ratio of 300. The mixture was then transferred into an autoclave following homogenization. The autoclave was closed then heated for 6 days at 170° C., with stirring. The crystalline product obtained was filtered, washed with water then dried overnight at 100° C. The solid was then introduced into a muffle furnace in which a calcining step was carried out: the calcining cycle comprised a rise in temperature to 200° C., a constant temperature stage at 200° C. maintained for 2 hours, a rise in temperature to 550° C. followed by a constant temperature stage at 550° C. maintained for 8 hours, followed by a return to ambient temperature.

The calcined solid product was analysed by X ray diffraction and identified as being constituted by solid IZM-2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing an IZM-2 zeolite, comprising at least the following steps:
   i) mixing, in an aqueous medium,
   at least one zeolite with structure type FAU having a molar ratio $SiO_{2(fau)}/Al_2O_{3\ (fau)}$ of greater than or equal to 30,
   at least one nitrogen-containing organic compound R, R being 1,6-bis(methylpiperidinium)hexane dihydroxide, and
   at least one source of at least one fluoride anion,
   optionally at least one additional source of an oxide XO2, wherein the molar ratio $XO2/SiO2_{(fau)}$ is in the range of 0 to 4,
   the mixture having the following molar composition:

| | |
|---|---|
| $(XO_2 + SiO_{2\ (fau)})/Al_2O_{3\ (fau)}$ | in the range 30 to 600, |
| $H_2O/(XO_2 + SiO_{2\ (fau)})$ | in the range 1 to 100, |
| $R/(XO_2 + SiO_{2\ (fau)})$ | in the range 0.01 to 0.6, and |
| $BF/(XO_2 + SiO_{2\ (fau)})$ | in the range 0.005 to 0.75, | in which
X is one or more tetravalent element(s) selected from the group consisting of the following elements: silicon, germanium, and titanium,
$SiO_{2(fau)}$ being the quantity of $SiO_2$ supplied by the FAU zeolite,
$Al_2O_{3\ (fau)}$ being the quantity of $Al_2O_3$ supplied by the FAU zeolite, and
BF is a fluorine salt, in which B is a cation selected from the cations NH4+, Na+, K+ and Li+, or is hydrofluoric acid in an aqueous solution, and
   ii) hydrothermal treatment of said mixture obtained from step i) at a temperature in the range of 120° C. to 200° C. for a period in the range of 1 day to 10 days, until said 1ZM-2 zeolite has been formed.

2. The process as claimed in claim 1, in which said zeolite with structure type FAU is Y zeolite.

3. The process as claimed in claim 1, in which the source BF of at least one anion is $NH_4F$ in aqueous solution.

4. The process as claimed in claim 1, in which X is silicon.

5. The process as claimed in claim 1, in which the additional source of an oxide $XO_2$ is added in the mixing step i), wherein the molar ratio $XO_2/SiO_{2\ (FAU)}$ is in the range of 0 to 3.

6. The process as claimed in claim 1, in which the reaction mixture obtained in step i) has the following molar composition:

| | |
|---|---|
| $(XO_2 + SiO_{2\ (FAU)})/Al_2O_{3\ (FAU)}$ | in the range 30 to 600, |
| $H_2O/(XO_2 + SiO_{2\ (FAU)})$ | in the range 10 to 70, |
| $R/(XO_2 + SiO_{2\ (FAU)})$ | in the range 0.05 to 0.45, and |
| $BF/(XO_2 + SiO_{2\ (FAU)})$ | in the range 0.01 to 0.65. |

7. The process as claimed in claim 1, in which the reaction mixture obtained in step i) has the following molar composition:

| | |
|---|---|
| $(XO_2 + SiO_{2\ (FAU)})/Al_2O_{3\ (FAU)}$ | in the range 80 to 450, |
| $H_2O/(XO_2 + SiO_{2\ (FAU)})$ | in the range 15 to 55 |
| $R/(XO_2 + SiO_{2\ (FAU)})$ | in the range 0.085 to 0.4, and |
| $BF/(XO_2 + SiO_{2\ (FAU)})$ | in the range 0.02 to 0.55. |

8. The process as claimed in claim 1, in which the mixture of step i) also contains at least one source of at least one alkali metal and/or alkaline-earth metal M with valency n, wherein n is a whole number greater than or equal to 1, and M is lithium, potassium, sodium, magnesium or calcium or a mixture thereof.

9. The process as claimed in claim 1, in which the hydrothermal treatment step ii) is carried out at a temperature in the range of 120° C. to 195° C.

10. The process as claimed in claim 1, in which the hydrothermal treatment step ii) is carried out for a period in the range of 2 days to 11 days.

11. The process as claimed in claim 1, in which the additional source of an oxide $XO_2$ is added in the mixing step i).

12. The process as claimed in claim 1, wherein X is silicon.

13. The process as claimed in claim 1, wherein BF is a fluorine salt, in which B is a cation selected from the cations $NH_4^+$, $Na^+$, $K^+$ and $Li^+$, in an aqueous solution.

14. The process as claimed in claim 1, wherein BF is hydrofluoric acid in an aqueous solution.

15. The process as claimed in claim 1, wherein the at least one zeolite with structure type FAU has a molar ratio $SiO_{2(FAU)}/Al_2O_{3(FAU)}$ of 30 to 100.

16. The process as claimed in claim 1, wherein the at least one zeolite with structure type FAU has a molar ratio $SiO_{2(FAU)}/Al_2O_{3(FAU)}$ of 80.

* * * * *